(12) United States Patent
Hughes et al.

(10) Patent No.: US 12,105,216 B2
(45) Date of Patent: Oct. 1, 2024

(54) WAVEFORM EMISSION LOCATION DETERMINATION SYSTEMS AND ASSOCIATED METHODS

(71) Applicant: Battelle Memorial Institute, Richland, WA (US)

(72) Inventors: Michael S. Hughes, Richland, WA (US); Eric G. Gonzalez, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 17/547,665

(22) Filed: Dec. 10, 2021

(65) Prior Publication Data

US 2023/0184880 A1 Jun. 15, 2023

(51) Int. Cl.
*G01S 5/22* (2006.01)
*G08B 13/16* (2006.01)
*G10L 25/51* (2013.01)

(52) U.S. Cl.
CPC ............ *G01S 5/22* (2013.01); *G08B 13/1672* (2013.01); *G10L 25/51* (2013.01)

(58) Field of Classification Search
CPC ........ G01S 5/22; G08B 13/1672; G10L 25/51
See application file for complete search history.

(56) References Cited

U.S. PATENT DOCUMENTS

| | | | |
|---|---|---|---|
| 6,178,141 B1 | 1/2001 | Duckworth et al. | |
| 7,126,877 B2 | 10/2006 | Barger et al. | |
| 7,433,266 B2 | 10/2008 | Ledeczi et al. | |
| 7,796,470 B1 | 9/2010 | Lauder et al. | |
| 8,005,631 B2 | 8/2011 | Barger et al. | |
| 8,325,563 B2 | 12/2012 | Calhoun et al. | |
| 9,689,966 B2 | 6/2017 | Damarla | |
| 10,089,845 B2 | 10/2018 | Skorpik et al. | |

(Continued)

FOREIGN PATENT DOCUMENTS

| | | | | |
|---|---|---|---|---|
| CN | 103852746 A | * | 6/2014 | ............... G01S 5/20 |
| EP | 1806952 | | 7/2007 | |

(Continued)

OTHER PUBLICATIONS

WO PCT/US2020/033167 IPRP, Nov. 16, 2021, Battelle Memorial Institute.

(Continued)

*Primary Examiner* — Isam A Alsomiri
*Assistant Examiner* — Abdallah Abulaban
(74) *Attorney, Agent, or Firm* — Wells St. John P.S.

(57) ABSTRACT

Waveform emission location determination systems and associated methods are described. According to one aspect, a waveform emission location determination system includes a plurality of detectors configured to receive a waveform emitted by a source and to generate electrical signals corresponding to the waveform, processing circuitry configured to access data corresponding to the electrical signals generated by the detectors, use the data to determine a plurality of spheres, and wherein a surface of each of the spheres contains a location of the source when the waveform was emitted by the source, determine an intersection of the spheres, and use the intersection of the spheres to determine the location of the source when the waveform was emitted by the source.

29 Claims, 7 Drawing Sheets

(56) References Cited

U.S. PATENT DOCUMENTS

| | | |
|---|---|---|
| 10,290,195 B2 | 5/2019 | Skorpik et al. |
| 10,741,038 B2 | 8/2020 | Skorpik et al. |
| 10,816,640 B2 | 10/2020 | Xie et al. |
| 11,112,418 B1 | 9/2021 | Holmes et al. |
| 2001/0004601 A1 | 6/2001 | Drane et al. |
| 2003/0214405 A1 | 11/2003 | Lerg et al. |
| 2004/0036602 A1 | 2/2004 | Lerg |
| 2004/0100868 A1 | 5/2004 | Patterson, Jr. et al. |
| 2007/0159924 A1 | 7/2007 | Vook et al. |
| 2008/0165621 A1 | 7/2008 | Fisher et al. |
| 2008/0219100 A1 | 9/2008 | Fisher et al. |
| 2008/0267012 A1 | 10/2008 | Fisher et al. |
| 2010/0118658 A1* | 5/2010 | Showen .................. G01S 5/18 367/127 |
| 2013/0192451 A1 | 8/2013 | Scott et al. |
| 2013/0206901 A1 | 8/2013 | Herman et al. |
| 2014/0269199 A1 | 9/2014 | Weldon et al. |
| 2014/0314250 A1 | 10/2014 | Park et al. |
| 2015/0345907 A1 | 12/2015 | Varga et al. |
| 2016/0063987 A1 | 3/2016 | Xu et al. |
| 2016/0260307 A1 | 9/2016 | Skorpik et al. |
| 2017/0003376 A1 | 1/2017 | Wellman et al. |
| 2017/0123038 A1 | 5/2017 | Griggs et al. |
| 2017/0169686 A1 | 6/2017 | Skorpik et al. |
| 2017/0180926 A1 | 6/2017 | Doherty |
| 2017/0234966 A1 | 8/2017 | Naguib et al. |
| 2017/0328683 A1 | 11/2017 | Smith |
| 2017/0328983 A1 | 11/2017 | Volgyesi et al. |
| 2018/0105270 A1 | 4/2018 | Xu et al. |
| 2018/0164397 A1 | 6/2018 | Griggs et al. |
| 2018/0306890 A1 | 10/2018 | Vatcher et al. |
| 2018/0356492 A1 | 12/2018 | Hamilton |
| 2019/0101613 A1 | 4/2019 | Griggs et al. |
| 2019/0162812 A1 | 5/2019 | Sloan |
| 2019/0212186 A1 | 7/2019 | Warren et al. |
| 2019/0228629 A1 | 7/2019 | Skorpik et al. |
| 2019/0281259 A1 | 9/2019 | Palazzolo |
| 2020/0355780 A1 | 11/2020 | Griggs et al. |
| 2021/0021763 A1 | 1/2021 | Zhou et al. |
| 2021/0080570 A1 | 3/2021 | Gonzalez et al. |
| 2021/0304784 A1* | 9/2021 | Paine .................. G10L 25/51 |
| 2021/0389412 A1 | 12/2021 | Gonzalez et al. |

FOREIGN PATENT DOCUMENTS

| | | |
|---|---|---|
| KR | 10-2015-0000441 | 1/2015 |
| WO | WO 2009/085361 | 7/2009 |
| WO | WO 2010/039130 | 4/2010 |
| WO | WO 2016/029469 | 3/2016 |
| WO | WO 2020/236607 | 11/2020 |
| WO | WO 2021/046062 | 3/2021 |

OTHER PUBLICATIONS

WO PCT/US2020/033167 Search Rept., Oct. 5, 2020, Battelle Memorial Institute.
WO PCT/US2020/033167 Writ. Opin., Oct. 5, 2020, Battelle Memorial Institute.
WO PCT/US2020/048957 Search Rept., Dec. 15, 2020, Battelle Memorial Institute.
WO PCT/US2020/048957 Writ. Opin., Dec. 15, 2020, Battelle Memorial Institute.
Albert et al., "Time Reversal Processing for Source Location in an Urban Environment", The Journal of the Acoustical Society of America, Aug. 2005, United States, pp. 616-619.
Albert, "Low Frequency Acoustic Pulse Propagation in Temperate Forests", The Journal of the Acoustical Society of America, Aug. 2015, United States, pp. 735-747.
Beck et al., "Variations in Recorded Acoustic Gunshot Waveforms Generated by Small Firearms", The Journal of the Acoustical Society of America, Apr. 2011, United States, pp. 1748-1759.
Freire, "Robust Direction-of-Arrival by Matched-Lags, Applied to Gunshots", The Journal of the Acoustical Society of America, Jun. 2014, United States, pp. 246-251.
Gonzalez et al., "Portal System for Real-Time Gunshot Detection, Localization, Alerting, and Recording", PNNL-SA-147910 Report, Dec. 12, 2019, United States, 9 pages.
Gonzalez et al., U.S. Appl. No. 62/849,877, filed May 18, 2019, titled "Low-Cost Highly Accurate Microphone Array for Echo-Location of Gunshots", 53 pages.
Gonzalez et al., U.S. Appl. No. 62/895,397, filed Sep. 3, 2019, titled "Portable System for Real-Time Gunshot Detection, Localization, Alert, and Recording", 15 pages.
Hughes et al., "Joint Entropy of Continuously Differentiable Ultrasonic Waveforms", The Journal of the Acoustical Society of America, Jan. 2013, United States, pp. 283-300.
Luzi et al., "Acoustic Firearm Discharge Detection and Classification in an Enclosed Environment", The Journal of the Acoustical Society of America, May 2016, United States, pp. 2723-2731.
Mehra et al., "Acoustic Pulse Propagation in an Urban Environment Using a Three-Dimensional Numerical Simulation", The Journal of the Acoustical Society of America, Jun. 2014, United States, pp. 3231-3242.
Mohan et al., "Localization of Multiple Acoustic Sources with Small Arrays Using a Coherence Test", The Journal of the Acoustical Society of America, Apr. 2008, United States, pp. 2136-2147.
Muhlestein et al., "Acoustic Pulse Propagation in Forests", The Journal of the Acoustical Society of America, Feb. 2018, United States, pp. 968-979.
PNNL, "Portal System for Real-Time Gunshot Detection, Localization, Alerting, and Recording", PNNL-SA-147910 Brochure, 2019, United States, 1 page.
Seybold, "Introduction to RF Propagation", Wiley-Interscience, John Wiley & Sons, Inc., 2005, United States, 342 pages.
Wikipedia, "68-95-99.7 Rule", available online at https://en.wikipedia.org/wiki/68%E2%80%9395%E2%80%9399.7_rule, Apr. 8, 2019, 4 pages.
Wu et al., "Blind Extraction and Localization of Sound Sources Using Point Sources Based Approaches", The Journal of the Acoustical Society of America, Aug. 2012, United States, pp. 904-917.
Wu et al., "Passive Sonic Detection and Ranging for Locating Sound Sources", The Journal of the Acoustical Society of America, Jun. 2013, United States, pp. 4054-4064.
WO PCT/US2020/048957 IPRP, Mar. 8, 2022, Battelle Memorial Institute.

\* cited by examiner

WAVEFORM EMISSION LOCATION DETERMINATION SYSTEMS AND ASSOCIATED METHODS

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

This disclosure relates to waveform emission location determination systems and associated methods of determining a location of a source of a waveform emission when the waveform was emitted from the source.

BACKGROUND OF THE DISCLOSURE

The number and complexity of public shootings has resulted in an enhanced desire to detect shootings as early as possible in efforts to protect unarmed members of the public. While a variety of technologies have been created and deployed for sensing and locating shooters in such instances, there is still a significant need for improvement.

Firearm discharges such as gunshots are significant energy events having both large audio decibel levels and long signal durations of up to half a second. Rapid identification of the location of a firearm discharge allows first responders to locate and engage the shooter as quickly as possible as well as search for and offer aid to potential victims. Information related to the detection and location of the shooter can be some of the most critical information provided to first responders.

At least some aspects of the disclosure described below are directed to systems and methods that provide accurate information regarding the locations of sources of waveform emissions, such as firearm discharges.

BRIEF DESCRIPTION OF THE DRAWINGS

Example embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

Figure 1:
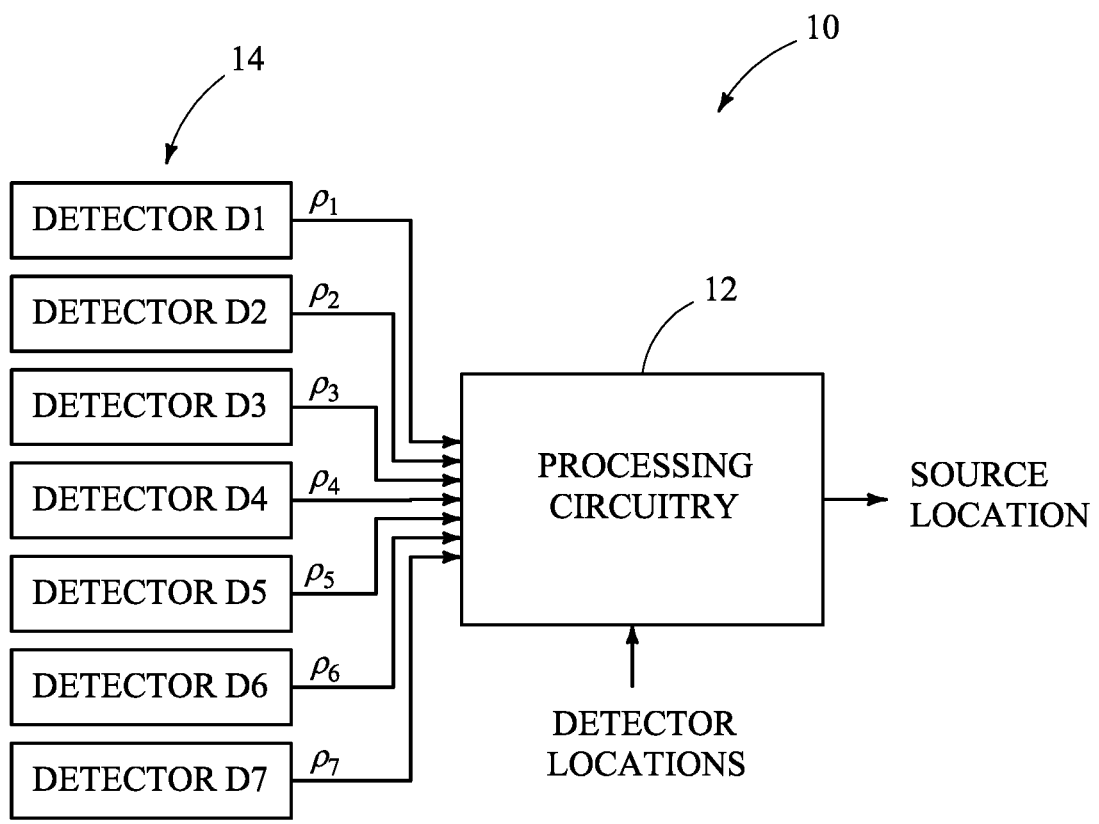
FIG. 1 is a functional block diagram of a waveform emission location determination system is shown according to one embodiment.

Referring to FIG. 1, a block diagram of a waveform emission location determination system 10 is shown according to one embodiment. The system 10 is configured to receive a waveform emitted from a source, to process the received waveform, and to generate information regarding a location of the source in space when the waveform was emitted from the source.

The illustrated system 10 includes processing circuitry 12 and a plurality of detectors 14. Detectors 14 are configured to receive the waveform emitted from the source. Example waveforms that may be received and processed by the system 10 produce a disturbance in a propagating medium that falls off with a power law dependence on distance from the source. Detectors 14 are configured to receive acoustic, electromagnetic or gravitational waveforms and generate respective electrical signals corresponding to the waveforms in example embodiments. In illustrative examples, detectors 14 are implemented as microphones and associated circuitry in embodiments where acoustic waveforms, such as firearm discharges, are being monitored, and antennae and associated circuitry in embodiments where electromagnetic waves are being monitored.

Detectors 14 may include analog-to-digital (A/D) conversion circuitry to generate corresponding digital data corresponding to the electrical signals and that is indicative of the waveforms received at the detectors 14. In one embodiment, the data generated by the detectors 14 is indicative of the amplitudes of the waveform received at the respective detectors 14 and may be referred to as waveform data.

Although seven detectors 14 are shown and labelled as D1-D7 in the arrangement of FIG. 1, other numbers of detectors 14 may be used in other embodiments. For example, two pairs of detectors 14 that are arranged along non-parallel axes may also be used to identify the location of the source of waveform in another embodiment.

Processing circuitry 12 includes a microprocessor that accesses or receives the waveform data from the detectors 14 in implementations where the detectors 14 include A/D conversion circuitry. Alternatively, processing circuitry 14 may receive the electrical signals that are generated by the detectors 14 and implement A/D conversion operations of the electrical signals internally to generate the waveform data corresponding to the electrical signals received from the detectors 14. Processing circuitry 12 may also include storage circuitry, such as RAM and ROM, for storing the waveform data, determined locations of the source of the waveform emission, locations of the detectors 14 in space, executable code which is executed by the microprocessor and any other digital information.

The processing circuitry 12 is configured to access and process information regarding the locations of the detectors 14 in space. A user may provide coordinates of the locations of the detectors 14 in space to the processing circuitry 12 once the system 10 was been installed in a particular application or implementation for monitoring of emitted waveforms in one embodiment. As described herein, processing circuitry 12 processes the waveform data generated by the detectors 14 in combination with the locations of the detectors 14 in space to determine the location of the source of the waveform in space when the waveform was emitted by the source. In one embodiment, an array of N detectors $D_i$, i=1, ..., N, are positioned at coordinates $(x_i,y_i,z_i)$, i=1, ..., N of an x, y, z coordinate system.

In one embodiment, each detector 14 has a logarithmic amplifier which is configured to generate an output signal (or trigger), only for input signals having amplitudes that exceed an application specific threshold, $\mathcal{T}_i$, i=1, ..., N. For indoor emission location determination in large spaces, an example threshold is 100 mV. An example threshold for outdoor emission location determination is 10 mV. Appropriate thresholds may be determined after installation and testing of the system 10.

Accordingly, at least some of the waveform data generated by the detectors 14 is disregarded as a result of the respective waveform data having amplitudes less than the respective threshold being used, and the processing circuitry uses other waveform data to determine the location of the source of the waveform emission as a result of amplitudes of the respective waveform data being greater than the respective threshold being used.

Figure 2:
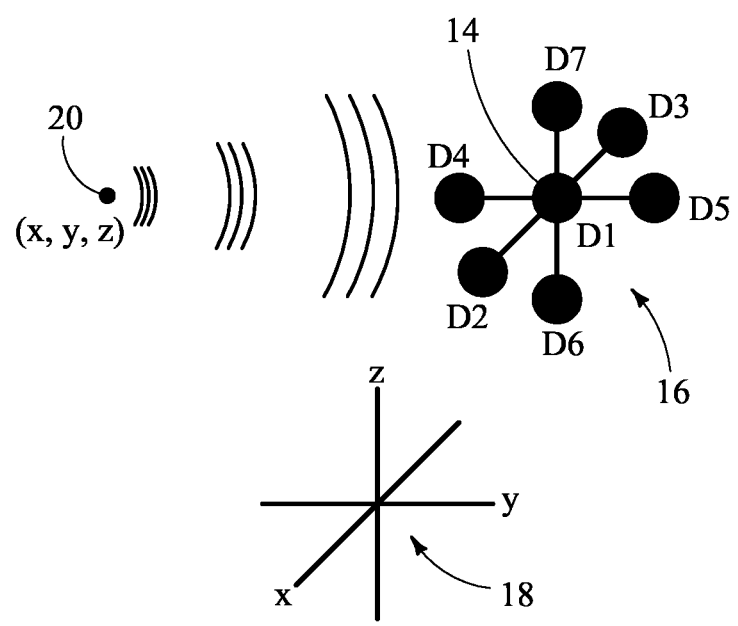
FIG. 2 is an illustrative representation of an emission source, detector array and common coordinate system according to one embodiment.

Referring to FIG. 2, an illustrative representation of an array 16 of detectors 14 is shown according to one embodiment. Detectors 14 are labelled D1-D7 and located along at least two non-parallel axes. In the illustrated embodiment, the detectors 14 are located on three orthogonal non-parallel axes arranged according to an x, y, z common coordinate system 18. In other embodiments, more or less numbers of detectors 14 may be utilized. During emission monitoring operations, respective x, y, z locations of the detectors 14 are known and used as discussed below to determine an x, y, z location the of source 20 when the waveform was emitted.

As described below, data generated by pairs of detectors 14 located on the plural axes are processed with respect to one another to determine the location of source 20 of the waveform emission. For example, data of different pairs of detectors D1, D2, D3, data of different pairs of detectors D1, D4, D5 and data of different pairs of detectors D1, D6, D7 may be processed with respect to one another.

Figure 3:
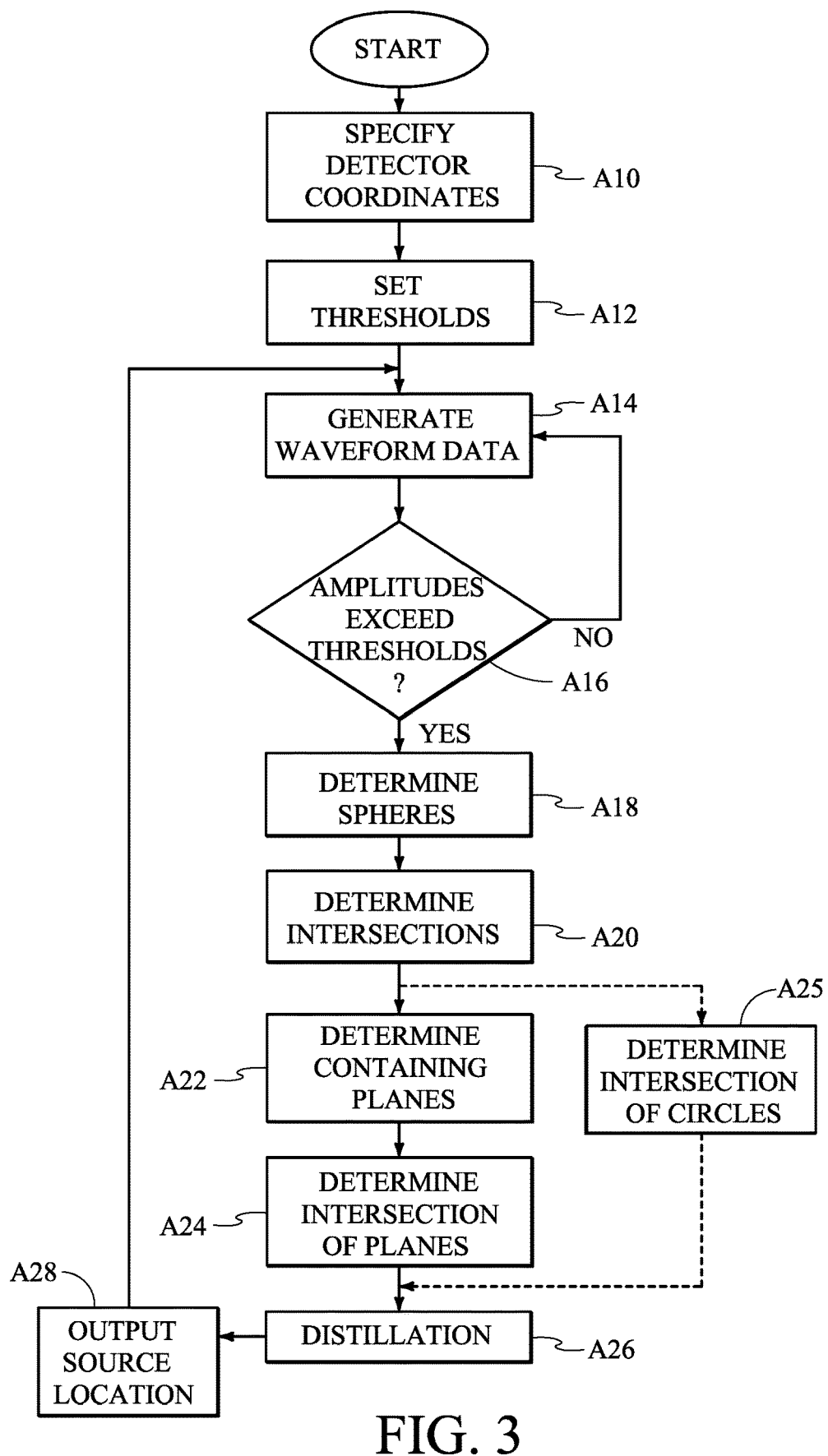
FIG. 3 is a flow chart of a method of identifying a location of a source of a waveform emission according to one embodiment.

Referring to FIG. 3, an example method performed by the waveform emission location determination system is shown according to one embodiment. The illustrated method includes processing waveform data generated by the detectors 14 in response to a received waveform. The illustrated method is implemented by the detectors 14 and processing circuitry 12 to determine the location of the source of the waveform when the waveform was emitted. Additional methods may be utilized including more, less and/or alternative acts.

At an act A10, the coordinates of the locations of the detectors 14 in space are specified by an operator of the waveform emission location determination system after the system has been installed for use in a given application.

At an act A12, the thresholds of the detectors 14 are set for comparison to waveform data subsequently generated by the detectors 14.

At an act A14, waveform data is generated in response to waveforms received by the detectors 14 and the waveform data is accessed by processing circuitry 12.

At an act A16, the amplitudes of the waveform data generated by the detectors 14 are compared to respective thresholds of the detectors 14 and waveform data having amplitudes less than the thresholds is filtered or removed and waveform data having amplitudes greater than the respective thresholds is processed in the subsequent acts.

At an act A18, the processing circuitry 12 processes the waveform data generated by the pairs of detectors 14 and the locations of the detectors 14 to determine a plurality of respective spheres on which the source 20 of the emission is located as discussed below. In one embodiment, a sphere is determined for each possible pair of detectors 14 shown in FIG. 2 using waveform data from the respective different pairs of detectors 14.

In one embodiment, the waveform amplitude data $A_i$, $(x_i,y_i,z_i)$, i=1, ..., N of the detectors 14 is processed in pairs by forming respective ratios of the waveform data of detectors D1, D2, D3, detectors D1, D4, D5 and detectors D1, D6, D7.

For waveform data (i.e., amplitude data) from a given pair of detectors $A_I,A_j$, I,j=1, ..., N, $\rho_{i,j}$ is calculated using equation 1, $$\rho_{i,j} \equiv 10^{-\frac{14_i}{20A_j}}, \tag{1}$$

From $\rho_{i,j}$, a sphere $S_{i,j}$ of radius $r_{i,j}$ is determined using equation 2, $$r_{i,j} \equiv \frac{\rho_{i,j}D_{i,j}}{|1-\rho_{i,j}^2|}. \tag{2}$$

where $$D_{i,j} = \sqrt{(x_i-x_j)^2+(y_i-y_j)^2+(z_i-z_j)^2}, \tag{3}$$

and having a center $\overline{x_{c_{i,j}}}$ specified by equation 4

$$\vec{x}_{c_{i,j}} = (x_{c_{i,j}}, y_{c_{i,j}}, z_{c_{i,j}}) = \left(\frac{(x_i-\rho_{i,j}^2 x_j)}{(1-\rho_{i,j}^2)}, \frac{(y_i-\rho_{i,j}^2 y_j)}{(1-\rho_{i,j}^2)}, \frac{(z_i-\rho_{i,j}^2 z_j)}{(1-\rho_{i,j}^2)}\right), \tag{4}$$

on which the source 20 of the emission is located. In one embodiment, the determined sphere may be referred to as an Equal Power Ratio Sphere (EPRS) for a pair of detectors $D_i$ and $D_j$ and may be denoted $S_{i,j}$.

In one embodiment, a plurality of spheres $S_{i,j}$, i, j=1, ..., N are calculated by the processing circuitry 12. In a more specific embodiment, three spheres are calculated by the processing circuitry 12 for three pairs of detectors located on three non-parallel axes, and the surface of each of the spheres contains the location of the source 20 when the waveform was emitted from the source 20. The output of act A18 $S_{i,j}$, i,j=1 ..., N includes geometric objects in the form of spheres defined by equations (1)-(4) and that correspond to different pairs of detectors 14.

The equations (2)-(4) center each of the spheres on a line connecting the detectors 14 of the respective detector pair and constrain a radius of each of the spheres to be less than half a distance between the detectors 14 of the respective detector pair. In addition, according to these equations, each of the spheres contains one of the detectors of the respective detector pair that is closest to the source when the waveform was emitted by the source Referring to FIG. 4A, an EPRS sphere 30 for $\rho_{i,j}$=1.4 and a corresponding pair of detectors 14 are shown along with a center 32 of a circle 34 of the sphere 30. The source 20 lies on the surface of the sphere 30.

Figure 4A:
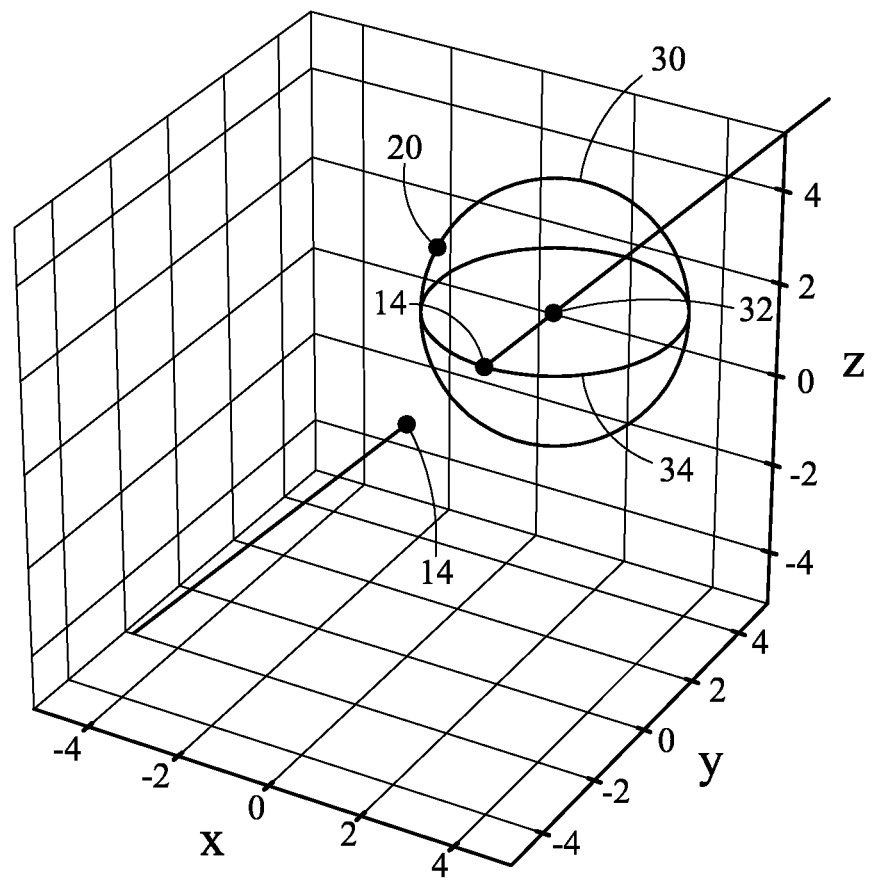
FIG. 4A is a three-dimensional view of a sphere that includes a location of a source of a waveform emission according to one embodiment.
Figure 4B:
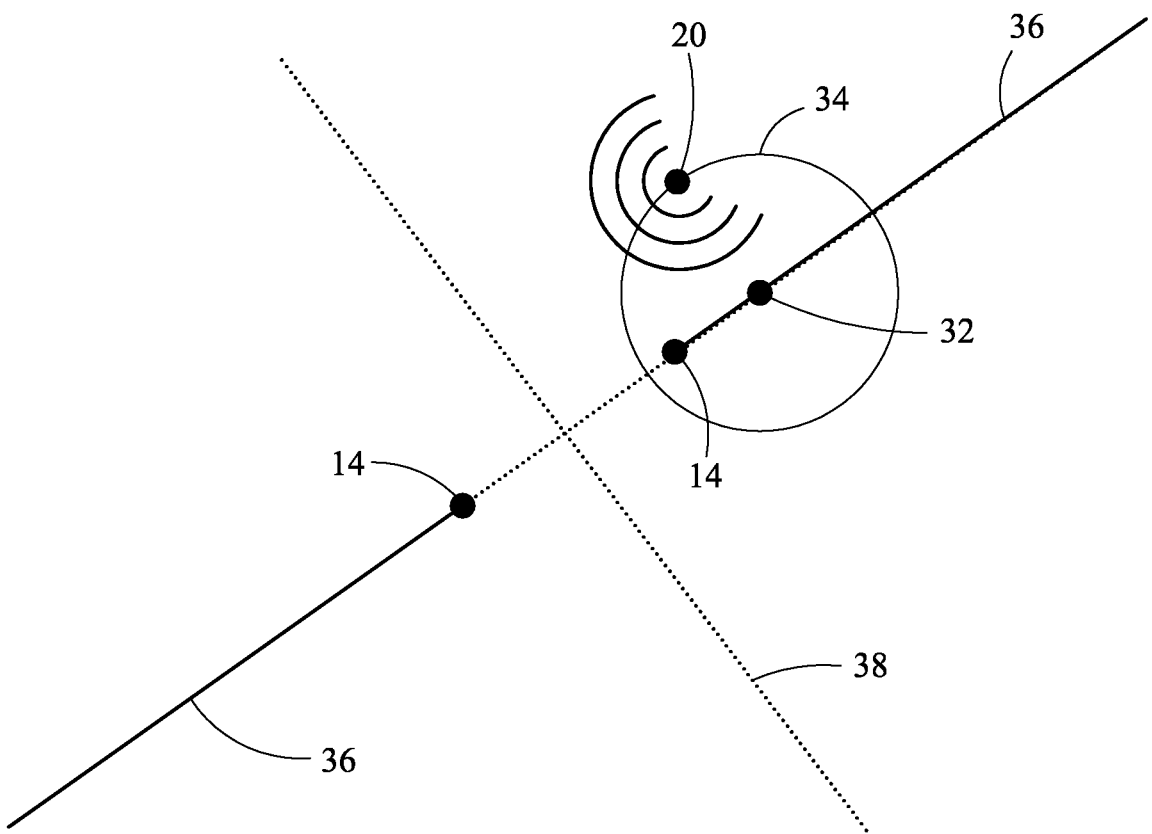
FIG. 4B is a cross-sectional plan view of the sphere of FIG. 4A.

Referring to FIG. 4B, a two-dimensional cross-section of the sphere 30 obtained by viewing the three-dimensional scene of FIG. 4A along a line that is perpendicular to a plane containing the detectors 14 at (x1,y1), (x2, y2), source 20 and line 36 at the intersection of line 36 and perpendicular bisector 38.

Referring again to FIG. 3, following the determination of the spheres, the depicted process proceeds to an act A20. At act A20, the processing circuitry determines the intersections of one or more pairs of the spheres computed in act A18 in the described embodiment, and the determined intersections may be used to determine the location of the source when the waveform was emitted by the source as discussed below.

Two spheres corresponding to the same source 20, one, $S_{i,j}$, with center $\overline{x_{c_{i,j}}}=(x_{c_{i,j}}, y_{c_{i,j}}, z_{c_{i,j}})$ and radius $r_{i,j}$ and another, $S_{k,l}$, with center $\overline{x_{c_{k,l}}}=(x_{c_{k,l}}, y_{c_{k,l}}, z_{c_{k,l}})$ and radius $r_{k,l}$, have an intersection that contains the location of the emission source 20. The intersection of two spheres defines: either an intersection circle, $C_{i,j;k,l}$, that may be referred to as an EPRS-intersection-circle, or an intersection point in three dimensional space. In the case that a point in space is identified as the intersection of the spheres, the identified intersection point corresponds to the location of the source of the emitted waveform in space when the waveform was emitted. The source of the emitted waveform is located on the determined intersection circles in cases when the intersections of the spheres are intersection circles.

For the case of circular intersection, a parametric equation for the points $$x_{i,j;k,l}=(p_{i,j;k,l})_1+h_{i,j;k,l}(a_{i,j;k,l})_1 \cos\xi+h_{i,j;k,l}(b_{i,j;k,l})_1 \sin\xi,$$

$$x_{i,j;k,l}=(p_{i,j;k,l})_2+h_{i,j;k,l}(a_{i,j;k,l})_2 \cos\xi+h_{i,j;k,l}(b_{i,j;k,l})_2 \sin\xi,$$

$$x_{i,j;k,l}=(p_{i,j;k,l})_3+h_{i,j;k,l}(a_{i,j;k,l})_3 \cos\xi+h_{i,j;k,l}(b_{i,j;k,l})_3 \sin\xi \quad (5)$$

where $\xi \in [0, 2\pi]$, and $\overline{p_{i,j;k,l}} \equiv ((p_{i,j;k,l})_1, (p_{i,j;k,l})_2, (p_{i,j;k,l})_3)$ is defined according to $$\vec{p}_{i,j;k,l} \equiv \vec{x}_{c_{i,j}} + \frac{r_{i,j}^2 - r_{k,l}^2 + d_{i,j;k,l}^2}{2 d_{i,j;k,l}} \hat{n}_{i,j;k,l}, \quad (6)$$

with $d_{i,j;k,l}=\|\overline{x_{c_{k,l}}}-\overline{x_{c_{i,j}}}\|$ explicitly written in terms of components of the vectors for the centers, $\overline{x_{i,j}}$ and $\overline{x_{k,l}}$ of the EPRSs as $$d_{i,j;k,l}=\sqrt{(x_{c_{k,l}}-x_{c_{i,j}})^2+(y_{c_{k,l}}-y_{c_{i,j}})^2+(z_{c_{k,l}}-z_{c_{i,j}})^2}, \quad (7)$$

with $$\hat{n}_{i,j;k,l} = \frac{(\vec{x}_{c_{k,l}} - \vec{x}_{c_{i,j}})}{d_{i,j;k,l}}, \quad (8)$$

$h_{i,j;k,l}$ is defined according to $$h_{i,j;k,l}^2 = r_{i,j}^2 - \left[\frac{r_{i,j}^2 - r_{k,l}^2 + d_{i,j;k,l}^2}{2 d_{i,j;k,l}}\right]^2 \quad (9)$$

The symbols $a_1, a_2, a_3$ are defined by $$(a_{i,j;k,l})_1 = \frac{1}{\sqrt{1+\frac{(x_{c_{i,j}}-x_{c_{k,l}})^2}{(z_{c_{i,j}}-z_{c_{k,l}})^2}}} = \frac{z_{c_{i,j}}-z_{c_{k,l}}}{\sqrt{(x_{c_{i,j}}-x_{c_{k,l}})^2+(z_{c_{i,j}}-z_{c_{k,l}})^2}}, \quad (10)$$

$(a_{i,j;k,l})_2 = 0$ $(a_{i,j;k,l})_3 =$ $$-\frac{x_{c_{i,j}}-x_{c_{k,l}}}{z_{c_{i,j}}-z_{c_{k,l}}} \frac{1}{\sqrt{1+\frac{(x_{c_{i,j}}-x_{c_{k,l}})^2}{(z_{c_{i,j}}-z_{c_{k,l}})^2}}} = -\frac{x_{c_{i,j}}-x_{c_{k,l}}}{\sqrt{(x_{c_{i,j}}-x_{c_{k,l}})^2+(z_{c_{i,j}}-z_{c_{k,l}})^2}}.$$

$b_1, b_2, b_3$ are defined using matrix notation as (11)

$$((b_{i,j;k,l})_1, (b_{i,j;k,l})_2, (b_{i,j;k,l})_3) =$$

$$\frac{\left(\begin{array}{c}(y_{c_{i,j}}-y_{c_{i,j}})(x_{c_{k,l}}-x_{c_{i,j}}), \\ -[(x_{c_{k,l}}-x_{c_{i,j}})(x_{c_{k,l}}-x_{c_{i,j}})+(z_{c_{k,l}}-z_{c_{i,j}})(z_{c_{k,l}}-z_{c_{i,j}})], \\ (y_{c_{k,l}}-y_{c_{i,j}})(z_{c_{k,l}}-z_{c_{i,j}})\end{array}\right)}{\sqrt{(x_{c_{i,j}}-x_{c_{k,l}})^2+(z_{c_{i,j}}-z_{c_{k,l}})^2}\sqrt{(x_{c_{k,l}}-x_{c_{i,j}})^2+(y_{c_{k,l}}-y_{c_{i,j}})^2+(z_{c_{k,l}}-z_{c_{i,j}})^2}}$$

The output of act A20 are geometric objects in the form of intersection circles, $C_{i,j;k,l}=S_{i,j} \cap S_{k,l}$, $i,j,k,l=1, \ldots, N$, that are defined by equation (5) and supporting equations (6), through (11) in the illustrated embodiment.

Figure 5:
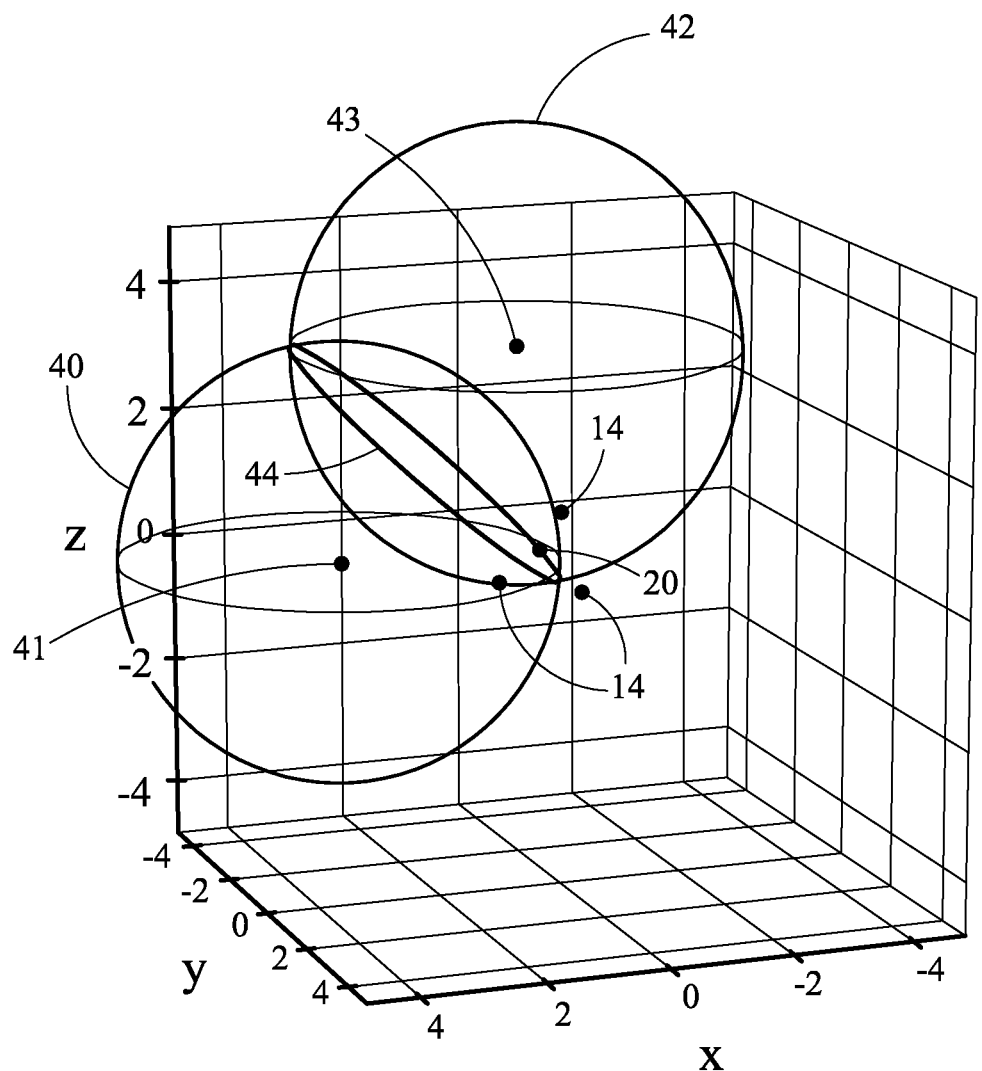
FIG. 5 is a three-dimensional view of two spheres and an intersection thereof that includes a location of a source of a waveform emission according to one embodiment.

Referring to FIG. 5, an intersection of two equi-power-ratio-spheres (EPRSs) $S_{1,2}$ and $S_{2,3}$ are shown as references 40, 42. A determined intersection of the spheres is an intersection circle $C_{1,2;2,3}$ that appears as a solid dark black ellipse 44 in FIG. 5. Centers of spheres 40, 42 are shown as references 41, 43, respectively. In FIG. 5, detectors 14 are located at coordinates (1:0; 0:0; 0:0), (0:0; 1:0; 0:0) and (0:0; 0:0; 1:0) and the source 20 was located at coordinates (0:512; 0:35; 0:5) when the waveform was emitted from the source.

The illustrated sphere 40 results from processing of waveform data from the two bottommost detectors of FIG. 5 while the illustrated sphere 42 results from processing of waveform data from the two rightmost detectors of FIG. 5. Other spheres and intersections thereof may be calculated using other pairs of detectors 14 and used to identify the location of the source when the waveform was emitted from the source in some embodiments.

Following act A20, the illustrated example method of FIG. 3 includes two different paths for using the intersection circles to determine the location of the source at a moment in time when the waveform was emitted from the source. The first path includes acts A22, A24, A26, and A28 while the second path includes acts A25, A26, and A28.

At act A22, the processing circuitry uses the intersection circles determined in act A20 to determine a plurality of planes. In one embodiment, the determined planes contain the intersection circles $C_{i,j;k,l}=S_{i,j} \cap S_{k,l}$, $i,j,k,l=1, \ldots, N$ determined in act A22 and may be referred to as containing planes. The planes include the location of the source when the waveform was emitted in the described example. Equations (6) and (8) may be used to specify a containing plane (denoted by $P_{i,j;k,l}$ below)

$$0 = (\vec{x} - \vec{p}_{i,j;k,l}) \cdot \hat{n}_{i,j;k,l}, \quad (12)$$

containing a respective intersection circle, which is the equation for a plane passing through the point $$\vec{p}_{i,j;k,l}=((p_{ij;k,l})_1,(p_{ij;k,l})_2,(p_{ij;k,l})_3)$$

perpendicular to the vector $$\hat{n}_{ij;k,l}$$

The processing of act A22 generates geometric objects in the form of the containing planes $P_{i,j;k,l}$, i,j,k,l=1, ..., N, which are specified by equation (12) in one embodiment.

At an act A24, the processing circuitry determines intersections of the containing planes that were computed in act A22 and the intersections of the containing planes include the location of the source in space when the waveform was emitted from the source.

If three mutually non-parallel planes $P_{i,j;k,l}$ are specified in act A22, their intersections may be used to determine the location of the source when the waveform was emitted. In this example, the equations are linear and may be solved in closed-form. Specifically, if an array of detectors $D_i$, i=1, ..., N is available, the array will produce $$\binom{N}{2}$$

power ratios $\rho_{i,j}$ and consequently $$\binom{N}{2}$$

spheres, which will in turn produce $$\binom{\binom{N}{2}}{2}$$

intersection circles. If the containing planes of at least three intersection circles intersect to produce mutually non-parallel lines (e.g., using an array 16 shown in the example embodiment of FIG. 2), then three intersection circles corresponding to detectors $D_{i_1}$, $D_{j_1}$, $D_{k_1}$ and $D_{l_1}$, $D_{i_2}$, $D_{j_2}$, $D_{k_2}$ and $D_{l_2}$, and $D_{i_3}$, $D_{j_3}$, $D_{k_3}$ and $D_{l_3}$ may be selected and to which selections there will correspond three equations of the same form as Eq. (12):

$$0=(\vec{x}-\vec{p}_{i,j;k,l})\cdot \hat{n}_{i,j;k,l}, \quad (13)$$

These are $$0=(\vec{x}-\vec{p}_{i_1,j_1;k_1,l_1})\cdot \hat{n}_{i_1,j_1;k_1,l_1},$$

$$0=(\vec{x}-\vec{p}_{i_2,j_2;k_2,l_2})\cdot \hat{n}_{i_2,j_2;k_2,l_2},$$

$$0=(\vec{x}-\vec{p}_{i_3,j_3;k_3,l_3})\cdot \hat{n}_{i_3,j_3;k_3,l_3}, \quad (14)$$

where $$\vec{p}_{i_1,j_1;k_1,l_1}=((p_{i_1,j_1;k_1,l_1})_1,(p_{i_1,j_1;k_1,l_1})_2,(p_{i_1,j_1;k_1,l_1})_3),$$

$$\hat{n}_{i_1,j_1;k_1,l_1}=((\hat{n}_{i_1,j_1;k_1,l_1})_1,(\hat{n}_{i_1,j_1;k_1,l_1})_2,(\hat{n}_{i_1,j_1;k_1,l_1})_1),$$

and similarly, for $$\vec{p}_{i_2,j_2;k_2,l_2},$$

$$\vec{p}_{i_3,j_3;k_3,l_3},$$

$$\hat{n}_{i_2,j_2;k_2,l_2},$$

When written out in component form these become $$0=(x-(p_{i_1,j_1;k_1,l_1})_1)(\hat{n}_{i_1,j_1;k_1,l_1})_1+(y-(p_{i_1,j_1;k_1,l_1})_2)(\hat{n}_{i_1,j_1;k_1,l_1})_2+(z-(p_{i_1,j_1;k_1,l_1})_3)(\hat{n}_{i_1,j_1;k_1,l_1})_3,$$

$$0=(x-(p_{i_2,j_2;k_2,l_2})_1)(\hat{n}_{i_2,j_2;k_2,l_2})_1+(y-(p_{i_2,j_2;k_2,l_2})_2)(\hat{n}_{i_2,j_2;k_2,l_2})_2+(z-(p_{i_1,j_1;k_1,l_1})_3)(\hat{n}_{i_1,j_1;k_1,l_1})_3,$$

$$0=(x-(p_{i_3,j_3;k_3,l_3})_1)(\hat{n}_{i_3,j_3;k_3,l_3})_1+(y-(p_{i_3,j_3;k_3,l_3})_2)(\hat{n}_{i_3,j_3;k_3,l_3})_2+(z-(p_{i_3,j_3;k_3,l_3})_3)(\hat{n}_{i_3,j_3;k_3,l_3})_3, \quad (15)$$

which comprise a system of three linear equations in the three unknowns that specify x, y, z location of the source of the waveform when the waveform was emitted from the source.

Equations (15) may be solved numerically or in closed form, e.g., using Cramer's rule, in terms of $(p_{i_1,j_1;k_1,l_1})_1$ through $(p_{i_3,j_3;k_3,l_3})_3$ and $(n_{i_1,j_1;k_1})_1$ through $(n_{i_3,j_3;k_3})_3$ which are determined by the positions of the detectors and the received amplitudes of the waveform data as specified by the equations of act A20. Cramer's rule is discussed in Macdonald, A.; *Linear and Geometric Algebra*, CreateSpace Independent Publishing Platform, ISBN-13: 978-1453854938, 2010, the teachings of which are incorporated herein by reference. Cramer's rule provides that if the detectors are located on three non-parallel axes, then $\mathcal{A}\neq 0$ and at least one of the possible equations Eq. (15) (or equivalently, Eq. (14)) is solvable. The size of the set $\mathcal{A}$ will depend on the location of the emitter and the locations of the detectors. The subsequent use of the linear system may be expressed in the vector notation of equation (14) to simplify notation by avoiding subscripting of already subscripted symbols.

There are choices of $\{i,j,k,l\in\{1, ..., N\}\}$ for which equation (15) (or equivalently equation (14)) are not solvable. For instance, if two of the planes are parallel that is avoided by using pairs of detectors that are located on non-parallel axes such as shown in the arrangement of FIG. 2.

Description of subsequent processing acts refer to a set of quadruple indices, i,j,k,l, for which a solution of equation (15) (or equivalently equation (14)) is possible, which we denote by $$A=\{(i,j,k,l)|i,j,k,l\in\{1,...,N\} \text{ and Eq. (15) is solvable}\}. \quad (16)$$

The output of act A24 is the estimated coordinates of the source when the waveform was emitted, $(x_{i,j;k,l},y_{i,j;k,l},z_{i,j;k,l})$, $(i,j,k,l)\in \mathcal{A}$ solving equation (14) or equivalently equation (15).

Figure 6:
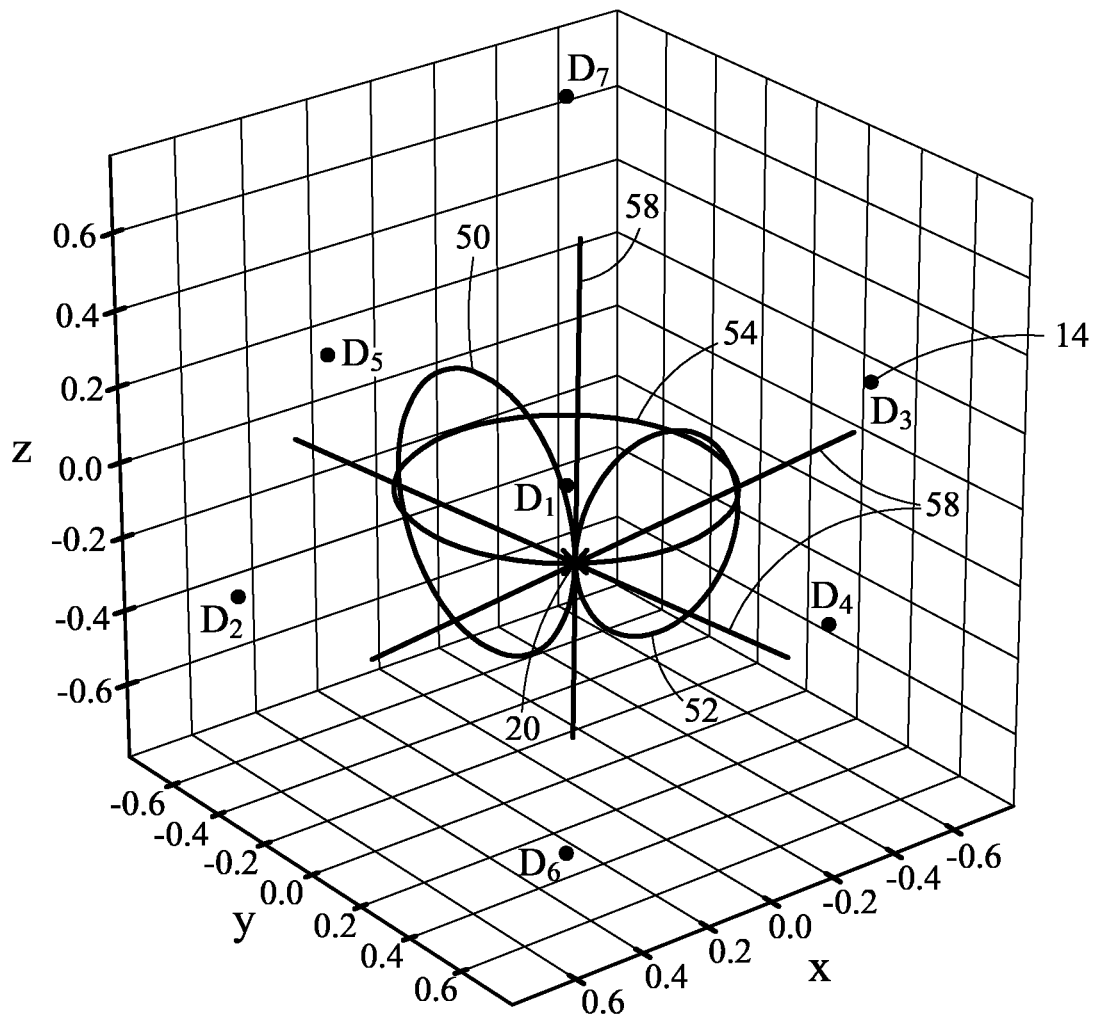
FIG. 6 is a three-dimensional view of three orthogonal arrays of detectors and corresponding intersection circles according to one embodiment.

Referring to FIG. 6, three orthogonal arrays of detectors produce intersection circles 50, 52, 54 that intersect uniquely and in a nonosculating manner regardless of the location of the source of the waveform emission due to the fact that each of the axes includes a subarray that produces intersection circles that have containing planes that are perpendicular to the line on which the subarray lies.

FIG. 6 shows a first sub array including detectors D1, D2, D3 located at respective coordinates (0, 0, 0), (−1, 0, 0), (1, 0, 0) and lying on the x-axis, a second subarray including detectors D1, D4, D5 located at respective coordinates (0, 0, 0), (0, −1, 0), (0, 1, 0) and lying on the y-axis, and a third subarray including detectors D1, D6, D7 located at coordinates (0, 0, 0), (0, 0, −1), (0, 0, 1) lying on the z-axis.

Also shown is a first intersection circle $C_{1,2;1,3}$ as reference 50 for the x-axis sub-array, an intersection circle $C_{1,4;1,5}$ as reference 52 for the y-axis sub-array and an intersection circle $C_{1,6;1,6}$ for the z-axis sub-array as reference 54. Also shown are three intersection lines 58 produced by the respective planes (see equation (12)) that contain the respective intersection circles.

At an Act A26, the estimated coordinates $(x_{i,j;k,l}, y_{i,j;k,l}, z_{i,j;k,l})$, $(i,j,k,l) \in \mathcal{A}$ determined in act A24 are estimates of the location of the source when the waveform was emitted since they are based on data, $\{A_i\}$, $\{(x_i, y_i, z_i)\}$, i=1, . . . , N that are contaminated by noise. In one embodiment, the estimated coordinates generated in act A24 are distilled into one solution including the coordinates of the location of the source when the waveform was emitted. There are numerous suitable clustering algorithms for implementing the distilling including computation of center of mass of the $(x_{i,j;k,l}, y_{i,j;k,l}, z_{i,j;k,l})$, k-means, Affinity Propagation, Agglomerative Clustering, BIRCH, DBSCAN or Gaussian Mixture Models in illustrative examples.

In addition, an error bound may be established for each of the coordinates, by propagation of error analysis on the original, $\{A_i\}$, $\{(x_i, y_i, z_i)\}$, i=1, . . . , N, applied in conjunction with the clustering algorithm being utilized. These techniques are built into Python implementations for: k-means, Affinity Propagation, Agglomerative Clustering, BIRCH, DBSCAN or Gaussian Mixture Models. The output of act A26 is the final emitter coordinates with error or noise $(x \pm \delta_x, y \pm \delta_y, z \pm \delta_z)$.

At an act A28, the coordinates of the location of the source of the emission may be outputted to an appropriate recipient, user or operator of the waveform emission location determination system. According to some embodiments discussed herein, the waveform emission location determination system may be implemented to determine the location of the source of a firearm discharge and the system may alert police, medics, first responders and/or other appropriate authorities of the location of the source of the waveform (i.e., firearm discharge) when the waveform was emitted in such example embodiments. The location of the source of the waveform emission when the waveform emission may be outputted or communicated in coordinates, displayed on a user interface and/or otherwise appropriately communicated to a desired recipient.

As mentioned above, an act A25 of an alternative processing path may be executed by the processing circuitry following the execution of act A20. In act A25, the processing circuitry accesses the intersections of the spheres (i.e., respective intersection circles determined in act A20) that individually contain the location of the source when the waveform was emitted by the source and determines an intersection of the circles to determine the location of the source when the waveform was emitted by the source.

In one more specific embodiment, the intersection circles, $C_{i,j;k,l} = S_{i,j} \cap S_{k,l}$, i,j,k,l=1, . . . , N, determined in act A20 are accessed. An array of detectors $D_i$, i=1, . . . , N, produces $$\binom{N}{2}$$

power ratios $\rho_{i,j}$, and consequently $$\binom{N}{2}$$

spheres, which will in turn produce $$\left(\binom{N}{2}\atop 2\right)$$

intersection circles. From these, the intersection circles, $C_{i,j;k,l}$, corresponding to detectors $D_i$, $D_j$, $D_k$ and $D_l$ are selected which will result in the following system of equations based on $x = (p_{i,j;k,l})_1 + h_{i,j;k,l}(a_{i,j;k,l})_1 \cos \xi + h_{i,j;k,l}(b_{i,j;k,l})_1 \sin \xi$, $y = (p_{i,j;k,l})_2 + h_{i,j;k,l}(a_{i,j;k,l})_2 \cos \xi + h_{i,j;k,l}(b_{i,j;k,l})_2 \sin \xi$, $z = (p_{i,j;k,l})_3 + h_{i,j;k,l}(a_{i,j;k,l})_3 \cos \xi + h_{i,j;k,l}(b_{i,j;k,l})_3 \sin \xi$, (17)

where i,j,k,l $\in \{1,2,3,4\}$, from a first intersection circle and $x = (p_{m,n;p,q})_1 + h_{m,n;p,q}(a_{m,n;p,q})_1 \cos \psi + h_{m,n;p,q}(b_{m,n;p,q})_1 \sin \psi$, $y = (p_{m,n;p,q})_2 + h_{m,n;p,q}(a_{m,n;p,q})_2 \cos \psi + h_{m,n;p,q}(b_{m,n;p,q})_2 \sin \psi$, $z = (p_{m,n;p,q})_3 + h_{m,n;p,q}(a_{m,n;p,q})_3 \cos \psi + h_{m,n;p,q}(b_{m,n;p,q})_3 \sin \psi$, (18)

where i,j,k,l $\in \{1,2,3,4\}$, from a second intersection circle

These are solved for x,y,z,$\xi$,$\psi$. While we have more equations than unknowns, which makes the system overdetermined, a consistent solution exists based on physical grounds (i.e., a source of the waveform exists). However, the equations are nonlinear even if the substitutions $X = \cos \xi$, $Y = \sin \xi$ and $\tilde{X} = \cos \psi$, $\tilde{Y} = \sin \psi$ are used to rewrite them as $x = (p_{i,j;k,l})_1 + h_{i,j;k,l}(a_{i,j;k,l})_1 X + h_{i,j;k,l}(b_{i,j;k,l})_1 Y$, $y = (p_{i,j;k,l})_2 + h_{i,j;k,l}(a_{i,j;k,l})_2 X + h_{i,j;k,l}(b_{i,j;k,l})_2 Y$, $z = (p_{i,j;k,l})_3 + h_{i,j;k,l}(a_{i,j;k,l})_3 X + h_{i,j;k,l}(b_{i,j;k,l})_3 Y$, $x = (p_{m,n;p,q})_1 + h_{m,n;p,q}(a_{m,n;p,q})_1 \tilde{X} + h_{m,n;p,q}(b_{m,n;p,q})_1 \tilde{Y}$, $y = (p_{m,n;p,q})_2 + h_{m,n;p,q}(a_{m,n;p,q})_2 \tilde{X} + h_{m,n;p,q}(b_{m,n;p,q})_2 \tilde{Y}$, $z = (p_{m,n;p,q})_3 + h_{m,n;p,q}(a_{m,n;p,q})_3 \tilde{X} + h_{m,n;p,q}(b_{m,n;p,q})_3 \tilde{Y}$, $1 = X^2 + Y^2$, $1 = \tilde{X}^2 + \tilde{Y}^2$ (19)

While a solution is known to exist on physical grounds, solving these equations for the seven unknowns x,y,z,X,Y,$\tilde{X}$,$\tilde{Y}$ (of which, the first three are of concern) may be undertaken numerically, for instance using the numerical solvers built into Python Scipy, e.g., scipy.optimize.

There are choices of i,j,k,l $\in \{1, \ldots, N\}$ for which equation (19) are not solvable either mathematically or numerically. For instance, if two of the circles are contained in parallel planes, or if two of the circles osculate and have nearly equal radii. However, the use of array 16 shown in the example embodiment of FIG. 2 reduces this occurrence.

Description of subsequent processing acts refer to a set of quadruple indices, i,j,k,l, for which solution of equation (19) is possible, and which is denoted by $\mathcal{A}' = \{(i,j,k,l) | i,j,k,l \in \{1, \ldots, N\}$ and Eq. (19) is solvable$\}$. (20)

If the detectors are located on three non-parallel axes, then $\mathcal{A}' \neq 0$ and at least one of the possible equations Eq. (19) is solvable. The size of the set $\mathcal{A}'$ will depend on the location of the emitter and the locations of the detectors.

The output of act A25 are estimated coordinates, $(x_{i,j;k,l}, y_{i,j;k,l}, z_{i,j;k,l})$, $(i,j,k,l) \in \mathcal{A}$ that are obtained by solving equation (19). In example embodiments, equation (19) may be solved by application of a solution algorithm, such as Bracketing and Bisection, the Secant Method, the False Position Method, the Ridders' Method, or the Van Wijngaarden-Dekker-Brent Method. Another example of a solution algorithm is described in William H. Press, et al., *Numerical Recipes in C, The Art of Scientific Computing*, Second Edition, Cambridge University Press, 1992, the teachings of which are incorporated herein by reference.

The estimated coordinates generated in act A25 may be distilled in act A26 to generate the coordinates of the location of the source when the waveform was emitted, and the generated coordinates of the location of the source following the distillation may be outputted in act A28 as mentioned above.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A waveform emission location determination system comprising:
   a plurality of detectors configured to receive a waveform emitted by a source and to generate electrical signals corresponding to the waveform;
   processing circuitry configured to:
      access data corresponding to the electrical signals generated by the detectors;
      use the data to determine a plurality of spheres, and wherein a surface of each of the spheres contains a location of the source when the waveform was emitted by the source;
      determine an intersection of the spheres; and
      use the intersection of the spheres to determine the location of the source when the waveform was emitted by the source.

2. The system of claim 1 wherein the processing circuitry is configured to use data from different pairs of the detectors to determine respective different ones of the spheres.

3. The system of claim 2 wherein axes of the plural pairs of the detectors are not parallel.

4. The system of claim 2 wherein axes of the plural pairs of the detectors are orthogonal to one another.

5. The system of claim 4 wherein three pairs of the detectors are positioned along axes that are orthogonal to one another.

6. The system of claim 2 wherein the processing circuitry is configured to use a ratio of the data from one of the pairs of the detectors to determine a respective one of the spheres.

7. The system of claim 2 wherein each of the spheres is centered on a line connecting the detectors of a respective one of the pairs of the detectors.

8. The system of claim 7 wherein a radius of each of the spheres is constrained to be less than half a distance between the detectors of a respective one of the pairs of the detectors.

9. The system of claim 2 wherein each of the spheres contains one of the detectors of the respective pair of the detectors that is closest to the source when the waveform was emitted by the source.

10. The system of claim 1 wherein the processing circuitry is configured to access locations of the detectors, and to use the locations of the detectors to determine the location of the source when the waveform was emitted by the source.

11. The system of claim 1 wherein the processing circuitry is configured to determine the intersection of the spheres as a circle, and wherein the location of the source when the waveform was emitted by the source is a location upon the circle.

12. The system of claim 1 wherein the processing circuitry is configured to determine the intersection of the spheres as a plane, and wherein the location of the source when the waveform was emitted by the source is a location upon the plane.

13. The system of claim 1 wherein the intersection of the spheres is a point corresponding to the location of the source when the waveform was emitted by the source.

14. The system of claim 1 wherein the spheres are first and second spheres and the intersection is a first intersection, and wherein the processing circuitry is further configured to:
   use the data to determine a third sphere;
   to determine a second intersection of the third sphere with respect another of the spheres; and
   use the second intersection to determine the location of the source when the waveform was emitted by the source.

15. The system of claim 14 wherein the first and second intersections are respective circles individually containing the location of the source when the waveform was emitted by the source.

16. The system of claim 15 wherein the processing circuitry is configured to determine an intersection of the circles to determine the location of the source when the waveform was emitted by the source.

17. The system of claim 14 wherein the processing circuitry is configured to use the first and second intersections to determine respective planes and to determine an intersection of the planes to determine the location of the source when the waveform was emitted by the source.

18. The system of claim 1 wherein the detectors are configured to receive the waveform comprising an acoustic waveform and to generate the electrical signals corresponding to the acoustic waveform.

19. The system of claim 1 wherein the detectors are configured to receive the waveform comprising an electromagnetic waveform and to generate the electrical signals corresponding to the electromagnetic waveform.

20. The system of claim 1 wherein the accessed data comprises data regarding amplitudes of the waveform received at the detectors.

21. The system of claim 20 wherein at least some of the data is disregarded as a result of the at least some data having amplitudes less than a threshold.

22. The system of claim 21 wherein other of the data is processed by the processing circuitry to determine the spheres as a result of the other data having amplitudes being greater than the threshold.

23. The system of claim 1 wherein the processing circuitry is configured to distill the determined location of the source after the determination of the location of the source.

24. The system of claim 1 wherein the detectors are configured to generate the electrical signals corresponding to the waveform comprising an acoustic waveform from a firearm discharge.

25. The system of claim 1 wherein the detectors are positioned along three non-parallel axes.

26. The system of claim 1 wherein the processing circuitry is configured to use the data to determine a radius and a center of each of the spheres.

27. The system of claim 26 wherein the centers of the spheres are at different locations.

28. The system of claim 1 wherein the processing circuitry is configured to determine the spheres without use of information regarding times of the reception of the waveform by the detectors.

29. The system of claim 1 wherein the processing circuitry is configured to use the data of a plurality of pairs of the detectors to determine respective ones of a plurality of ratios of power, and to use the ratios of power to determine respective ones of the spheres.

* * * * *